(12) United States Patent
Strupp

(10) Patent No.: US 7,248,004 B2
(45) Date of Patent: Jul. 24, 2007

(54) COOLING FAN, IN PARTICULAR FOR MOTOR VEHICLES

(75) Inventor: Michael Strupp, Cheongwon-Gun (KR)

(73) Assignee: Robert Bosch GmbH, Stuttgart (DE)

( * ) Notice: Subject to any disclaimer, the term of this patent is extended or adjusted under 35 U.S.C. 154(b) by 930 days.

(21) Appl. No.: 10/399,303

(22) PCT Filed: Aug. 2, 2002

(86) PCT No.: PCT/EP02/08612

§ 371 (c)(1),
(2), (4) Date: Jul. 28, 2003

(87) PCT Pub. No.: WO03/016668

PCT Pub. Date: Feb. 27, 2003

(65) Prior Publication Data

US 2004/0022638 A1 Feb. 5, 2004

(30) Foreign Application Priority Data

Aug. 16, 2001 (DE) ............................... 101 40 094

(51) Int. Cl.
*H02P 5/00* (2006.01)
(52) U.S. Cl. ..................... 318/49; 318/66; 318/83; 318/95; 417/2; 417/3
(58) Field of Classification Search .............. 318/34, 318/49, 56, 57, 60, 63, 83, 93; 417/2, 3
See application file for complete search history.

(56) References Cited

U.S. PATENT DOCUMENTS

| 3,163,252 | A | * | 12/1964 | Koci | ........................ 180/65.1 |
|---|---|---|---|---|---|
| 4,779,577 | A | | 10/1988 | Ritter et al. | |
| 4,988,930 | A | | 1/1991 | Oberheide | |
| 5,371,445 | A | | 12/1994 | Couetoux | |
| 5,488,835 | A | * | 2/1996 | Howenstine et al. | .......... 62/186 |
| 5,825,974 | A | * | 10/1998 | Hutton et al. | ................ 392/360 |
| 6,614,194 | B2 | * | 9/2003 | Kobayashi et al. | ......... 318/111 |

(Continued)

FOREIGN PATENT DOCUMENTS

DE      35 34 908 A1      4/1978

(Continued)

OTHER PUBLICATIONS

Patent Abstracts of Japan vol. 009, No. 268 (M-424), Oct. 25, 1985 & JP 60 113723 A, Jun. 20, 1985.

*Primary Examiner*—Paul Ip
(74) *Attorney, Agent, or Firm*—Michael J. Striker

(57) ABSTRACT

A radiator blower, in particular for motor vehicles, is indicated that comprises a plurality of individual fans (11, 12), each having an electrical drive motor (13, 14), and a plurality of switches (S1, S2, S3), each capable of being switched over into two positions, by means of which the drive motors (13, 14) are capable of being turned on and back off individually or in a series or parallel connection. To prevent disturbing noises from developing when the individual fan (11, 12) comes to rest after being turned off, when the operating drive motor or motors (13, 14) is/are turned off, an electronic control unit (20) forces the switches (S1, S2, S3)—at least temporarily—over into switch positions that bring about a short-circuiting of the turned-off drive motor or motors (FIG. 1).

11 Claims, 3 Drawing Sheets

U.S. PATENT DOCUMENTS

| | | | |
|---|---|---|---|
| 6,747,432 B2* | 6/2004 | Yoshimura | 318/599 |
| 7,135,826 B2* | 11/2006 | Ma et al. | 318/49 |
| 2002/0093299 A1* | 7/2002 | Kobayashi et al. | 318/34 |
| 2003/0140643 A1* | 7/2003 | Yoshimura | 62/186 |
| 2006/0022620 A1* | 2/2006 | Gubbels | 318/66 |
| 2006/0099082 A1* | 5/2006 | Simofi-llyes et al. | 417/3 |
| 2006/0175992 A1* | 8/2006 | Makaran | 318/66 |
| 2006/0261761 A1* | 11/2006 | Ma et al. | 318/49 |

FOREIGN PATENT DOCUMENTS

| | | |
|---|---|---|
| DE | 28 27 373 | 1/1980 |
| GB | 1 554 695 A | 10/1979 |
| JP | 59-160095 | 9/1984 |

* cited by examiner

| Starting State | | | | Switching and Final State | | | | | | |
|---|---|---|---|---|---|---|---|---|---|---|
| Motor operating state | Switch Position | | | Intermediate State | | | | Final State | | |
| | S1 | S2 | S3 | S1 | S2 | S3 | Duration | S1 | S2 | S3 |
| 1. Motor 13 on, motor 13 off | 1 | 0 | 1 | 0 | 1 | 0 | t1 | 0 | 0 | 0 |
| 2. Motor 14 on, motor 14 off | 1 | 1 | 0 | / | / | / | / | 0 | 0 | 0 |
| 3. Motors 13 and 14 connected in parallel | 1 | 0 | 0 | 0 | 1 | 0 | t2 | 0 | 0 | 0 |
| 4. Motors 13 and 14 connected in series | 1 | 1 | 1 | 0 | 1 | 0 | t3 | 0 | 0 | 0 |
| 5. Motors 13 and 14 off | 0 | 0 | 0 | / | / | / | / | 0 | 0 | 0 |

COOLING FAN, IN PARTICULAR FOR MOTOR VEHICLES

BACKGROUND OF THE INVENTION

The invention is based on a radiator blower, in particular for motor vehicles, according to the preamble of claim 1.

Radiator blowers are used in motor vehicles that comprise at least two separate individual fans to cover a large demand for cooling, which said fans are operated either to ventilate the radiator of the internal combustion engine evenly, or to ventilate the radiator of the internal combustion engine and an air conditioner separately within a common circuit configuration that makes it possible to turn on either just one of the individual fans or both individual fans in series or in parallel.

When such radiator blowers come to rest after being turned off, they generate noise that is not inconsiderable, because the individual fans pass through various resonant frequencies that, depending on excitation, can result in disturbing tonal magnifications in the noise spectrum. The tonal magnifications are perceived as being very unpleasant in particular when an internal combustion engine is running at idle and producing little noise, or when the internal combustion engine is switched off.

ADVANTAGES OF THE INVENTION

The radiator blower according to the invention having the features of claim 1 has the advantage that, when the individual fans are switched off, their drive motors are operated at least temporarily in short circuit immediately after they are switched off, so that the short-circuited drive motor operates in the generating mode and comes to a stop after less than 20-30% of its usual slow-down time. The only switches and electric lines used to short circuit the drive motors are those that are provided in the circuit configuration anyway to perform on/off switching functions and establish series and parallel connections. No additional components are required, therefore, to short circuit the drive motors after they are turned off, and noise abatement is achieved at practically no additional cost. The only modification that is required is the triggering of the switches-which is carried out as programmed by the electronic control unit-when the individual fans are shut off, which can be achieved by making a cost-negligible software change.

Advantageous further developments and improvements of the radiator blower indicated in claim 1 are made possible by the measures listed in the further claims.

According to a preferred exemplary embodiment of the invention, n available drive motors are situated in n parallel sub-circuits, whereby n is a whole number greater than one. The network formed by the n parallel sub-circuits is connected via a switch—designed as a NO contact having one active switch contact—to a voltage source. Additionally, to operate n drive motors individually in n–1 parallel sub-circuits, one switch—designed as a NC contact having one active switch contact-is connected in series with each respective drive motor. These circuitry features make it possible to turn selected drive motors on and off by closing and opening the NO contact, while the drive motors to be put into operation are selected by actuating the NC contact. If a NC contact in a parallel branch is opened, the associated drive motor is no longer affected by the common control by the NO contact.

To connect the n drive motors in series, according to an advantageous exemplary embodiment of the invention, a switch designed as a changeover switch having two active switch contacts is located in each of n–1 parallel sub-circuits. In each case, the changeover contact is located on the connection side of the drive motor opposite the NC contact, whereby the first switch contact of the changeover contact is located in the sub-circuit, and the second switch contact is connected to the connection between the NC contact and the drive motor in the adjacent sub-circuit. Only one changeover contact is located in the first of n parallel sub-circuits, and only one NC contact is located in the last of the parallel sub-circuits, whereby one is located on the high-potential side, and the other is located on the low-potential side of the respective associated drive motor. This circuit configuration provides advantages in terms of regulating the speed of the individual fans and adjusting the cooling output.

Since it is usually sufficient to operate two individual fans in series, a switch—designed as a changeover contact having two active switch contacts—is located, according to an advantageous exemplary embodiment of the invention, on the connection side of the drive motor opposite the NC contact in each uneven-numbered, parallel sub-circuit as counted from the NO contact, in order to connect two of the n drive motors in series, with the possibility of operating the series connections of two drive motors in parallel. The first switch contact of said switch is located in the sub-circuit, and the second switch contact of said switch is connected to the connection between the NC contact and the drive motor in the subsequent, even-numbered, parallel sub-circuit. A cost advantage can be obtained with this circuit configuration by the fact that a changeover contact can be eliminated from every second sub-circuit.

The changeover contacts serving to establish either a series or parallel connection of the drive motors are also used, according to an advantageous exemplary embodiment of the invention, to temporarily short circuit the drive motor that is located in the same parallel sub-circuit by establishing a short-circuit connection in the adjacent, parallel sub-circuit by changing over to the second switch contact via the changeover contact and the NC contact situated in the closed position. When the NO contact is opened in order to turn the drive motors off, the drive motor located in the last parallel sub-circuit and connected only in series with the NC contact is short-circuited—after at least one of the changeover contacts is switched back to its first switch contact—via the drive motor connected in series with this changeover contact and the closed NC contact connected in series with said changeover contact in the sub-circuit.

According to an advantageous exemplary embodiment of the invention, an electronic control unit is provided that triggers the switches—according to a specified program—to change over in order to turn the drive motors on and off and establish the series and parallel connection. When the drive motors are turned off, the switches are triggered in such a fashion that the NO contact assumes its opened position, the NC contacts assume their closed position, and the changeover contacts are switched over to their first switch contacts. To turn off the drive motors that are operating, the switches are triggered in such a fashion that the NO contact opens, the NC contacts are moved to their closed position, and the changeover contacts are temporarily switched over to their second switch contact.

SUMMARY OF THE DRAWINGS

The invention is described in greater detail in the description hereinbelow with reference to the exemplary embodiments presented in the drawings.

DESCRIPTION OF THE PREFERRED EMBODIMENTS

Figures 1, 2:
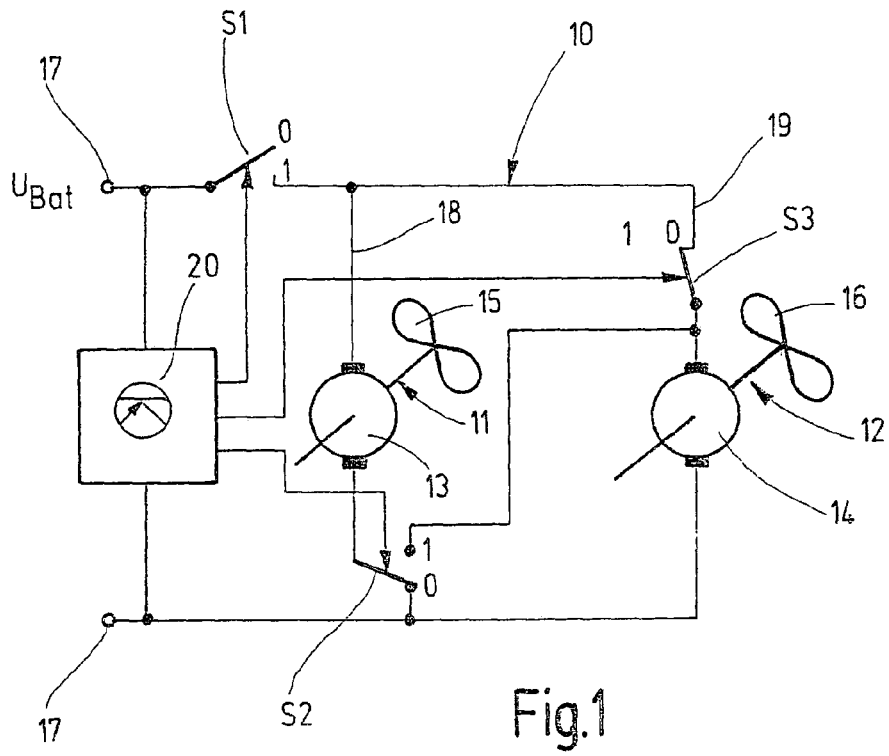
FIG. 1 is a diagram of a radiator blower having two individual fans operated in one circuit configuration.
FIG. 2 is a representation of the control program for triggering the switches in the circuit configuration according to FIG. 1.
Figure 3:
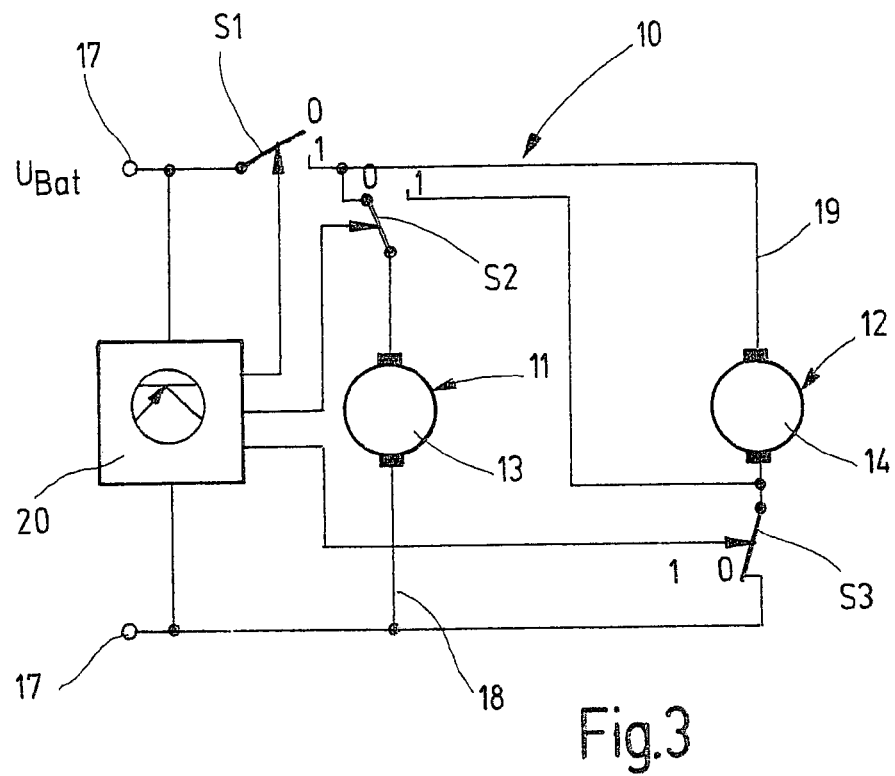
FIG. 3 is a modified diagram of a radiator blower having two individual fans.

The radiator blower shown in diagram form in FIGS. 1 and 3 comprises two individual fans 11, 12, each of which has a fan wheel 15 and 16 driven by an electric drive motor 13 and 14. The drive motors 13, 14—designed as DC motors—are integrated in a circuit configuration 10 comprising a plurality of switches in such a fashion that they are capable of being connected to and disconnected from a voltage source 17 by actuating the switches accordingly, whereby the two drive motors 13, 14 can be operated individually or together in a series or parallel connection. The switches are switched by an electronic control unit 20 that sends appropriate control signals to the switches, according to a specified program, to reverse them.

In FIG. 1, the circuit configuration 10 for the two drive motors 13, 14 comprises a total of three switches, one of which is designed as a NO contact S1 having one active switch contact, another one of which is designed as a NC contact S3 having one active switch contact, and the further one of which is designed as a changeover contact S2 having two active switch contacts. Each switch has two switch positions, 0 and 1, whereby the three switches S1-S3 are designed so that, in the non-triggered state, they assume their "0" switch position in which the NO contact S1 is open, the NC contact S3 is closed, and the changeover contact S2 is switched to the first of two active switch contacts.

The two drive motors 13, 14 are located in two parallel sub-circuits 18 and 19 that are both connected to the voltage source 17 via NO contact S1. In sub-circuit 19, NC contact S3 is connected in series with drive motor 14, while, in sub-circuit 18, changeover switch S2 is connected in series with drive motor 13. The first switch contact of changeover contact S2 is located in sub-circuit 18, so that, when changeover switch S2 is switched to the first switch contact (switch position 0), sub-circuit 18 is closed. The second active switch contact of changeover contact S2 is connected to the connection between NC contact S3 and drive motor 14 in sub-circuit 19. Changeover contact S2 is located in sub-circuit 18 on the low-potential side of drive motor 13, i.e., on the ground side, while NC contact S3 in sub-circuit 19 is located on the high-potential side of drive motor 13. When NO contact S1 is closed, therefore, said drive motor is connected with the DC voltage potential $U_{Bat}$ of voltage source 17.

It is possible to flip-flop the arrangement of the switches S2 and S3 with regard for the drive motors 13 and 14 in the parallel sub-circuits 18,19, so that—as shown in the modified circuit configuration in FIG. 3—changeover switch S2 is located on the high-potential side of drive motor 13, and NC contact S3 is located on the low-potential side of drive motor 14.

Switches S1, S2 and S3 are triggered by means of the electronic control unit 20 according to the control program shown in FIG. 2 in table form. Using a control logic integrated in the electronic control unit 20 and based on operating data, a decision is made whether to put just drive motor 13 or just drive motor 14 into operation, or to put both drive motors 13,14 in operation in a parallel or series connection.

When the radiator blower is turned off, all switches S1, S2 and S3 assume their "0" switch position, as illustrated in FIG. 1. Basically, NO contact S1 serves to establish the electrical connection with the voltage source 17. NC contact S3 and changeover contact S2 determine whether individual fan 11 or individual fan 12 is put into operation, or whether both fans 11 and 12 are put into operation in a series or a parallel connection.

If the intention is to turn on only individual fan 11 with drive motor 13, then the electronic control unit 20 closes NO contact S1 and opens NC contact S3, as indicated in the first program line in FIG. 2. To turn it off, NO contact S1 is reopened, and NC contact S3 is closed again, and changeover contact S2 is switched over to its second switch contact (switch position 1) for a time interval t1. As a result, drive motor 13 is short-circuited via changeover contact S2 and NC contact S3, so that it comes to a standstill quickly. When the time interval t1 is over, the changeover contact S2 is switched back to its first switch contact. All switches S1, S2 and S3 assume their home positions, which is described in FIG. 2 as "Final State".

If the intention is to turn on only individual fan 12, the electronic control unit 20 triggers NO contact S1 and changeover contact S2 in such a fashion that NO contact S1 closes and changeover contact S2 switches to its second switch contact, as shown in the second program line in FIG. 2. As a result, only drive motor 14 is connected to the voltage source 17. To turn drive motor 14 back off, the two switches S1 and S2 are returned to their home positions. As a result, the turned-off drive motor 14 is short-circuited via closed NC contact S3, drive motor 13, and changeover contact S2 located in switch position 0, and it is braked to a halt very quickly.

If the intention is to put both individual fans 11, 12 into operation simultaneously and run their electric drive motors 13, 14 in a parallel connection, then only NO contact S1 is closed, as shown in the third program line in FIG. 2. The two drive motors 13, 14 are therefore connected in parallel with the voltage source 17. To turn off the two operating drive motors 13, 14, NO contact S1 is opened, and changeover contact S2 is switched to its second switch contact (switch position 1) for the duration t2. As a result, drive motor 13 is short-circuited via changeover contact S2 and NC contact S3 located in its closed position, and it is braked to a halt quickly. After the time interval t2, changeover contact S2 is switched over to its "0" switch position, and its first switch contact is contacted. The slowing-down drive motor 14 is therefore short-circuited via NC contact S3, drive motor 13, and changeover contact S2, and it is braked to a halt as well.

If the intention is to put both individual fans 11, 12 into operation, but drive motors 13, 14 must be operated in a series connection, the electronic control unit 20 triggers all switches S1, S2 and S3 to switch over, as shown in the fourth program line in FIG. 2. NO contact S1 closes, changeover contact S2 is switched over to its second switch contact, and NC contact S3 opens. With NO contact S1 closed, drive motors 13, 14 are now connected in series with the voltage source 17 via the changeover contact S2. If the operating individual fans 11,12 must be turned back off, NO contact S1 and NC contact S3 are triggered first of all in such a way that NO contact S1 opens, and NC contact S3 closes. Drive motor 13 is therefore short-circuited via changeover contact S2 and NC contact S3, and it quickly comes to a standstill. After a time interval t3, changeover contact S2 is triggered by the control electronics 20 once more and returned to its "0" switch position in which it contacts its first switch contact. Drive motor 14 is now short-circuited via NC contact S3, drive motor 13, and changeover contact S2.

Figure 4:
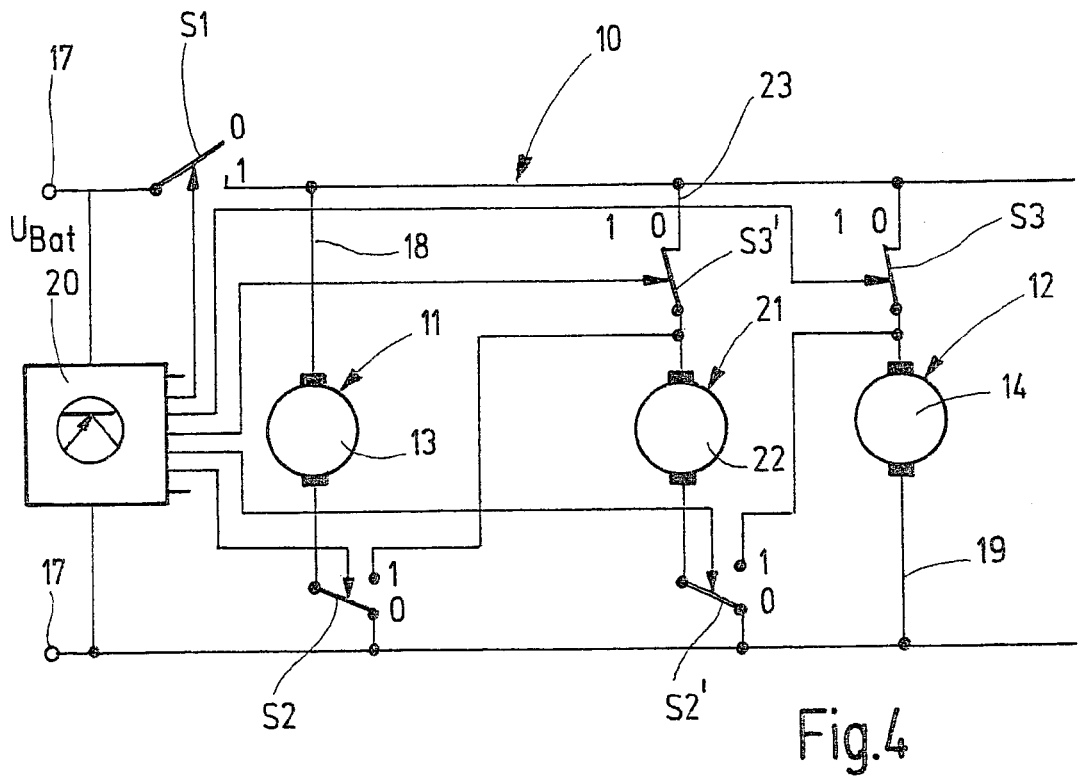
FIG. 4 is a diagram of a radiator blower having three individual fans.

In the exemplary embodiment of the radiator blower according to FIG. 4, the radiator blower is equipped with a third individual fan 21, the electric drive motor 22 of which is connected, in a further parallel sub-circuit 23, in series with a further NC contact S3' and a further changeover contact S2'. The connection between the second switch contact of changeover contact S2 to sub-circuit 19 is broken. Instead, the second switch contact of the further changeover contact S2' is connected to the connection between NC contact S3 and drive motor 14 in sub-circuit 19. The second switch contact of changeover contact S2 is connected to the connection between the further NC contact S3' and drive motor 22 in sub-circuit 23.

Of course, even more parallel sub-circuits, each having a drive motor, can be located between sub-circuits 18 and 19 in the circuit configuration 10 according to FIG. 4 in the same fashion as sub-circuit 23. Every additional sub-circuit is designed identical to sub-circuit 23. With this circuit configuration 10, all n drive motors can then be operated individually or together in a parallel or series connection, whereby n is a whole number greater than one. When each of the operating drive motors is turned off, the drive motors are short-circuited temporarily and braked to a halt by opening NO contact S1—which is common to all drive motors—and correspondingly switching over NC contacts S3, S3' and changeover contacts S2, S2', so that the critical resonant frequencies of individual fans 11, 12, 21 are passed through very quickly.

Figure 5:
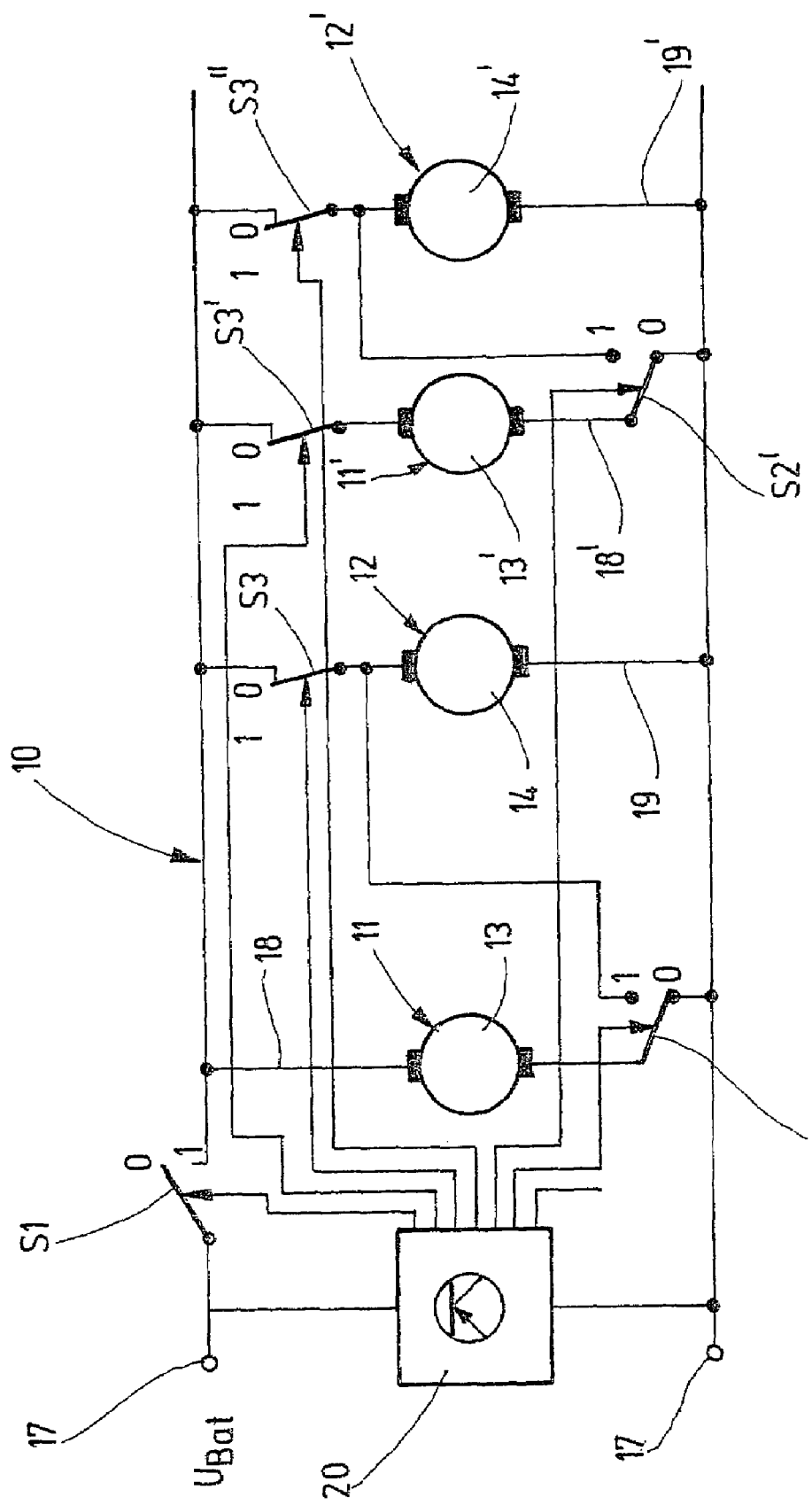
FIG. 5 is a diagram of a radiator blower having four individual fans.

In the exemplary embodiment of the radiator blower according to FIG. 5, the radiator blower is equipped with a total of four individual fans 11, 12, and 11' and 12'. The two individual fans 11', 12'—that are additional as compared with FIG. 122—are located, with their drive motors 13' and 14', in parallel sub-circuits 18' and 19' of the circuit configuration 10, whereby drive motor 14' is connected in series with a NC contact S3" in the same fashion as drive motor 14, and drive motor 13' is connected in series with a changeover contact S2' in the same fashion as drive motor 13. The second active switch contact "1" of said changeover contact S2' is connected to the connection between NC contact S3" and drive motor 14' in sub-circuit 19'. Additionally, a NC contact S3' is installed upstream from drive motor 13' in sub-circuit 19'. The three new additional switches S3', S3" and S2' are triggered by the electronic control unit 20.

In the circuit configuration shown in FIG. 5, all four drive motors 13, 14, 13', 14' can be operated in parallel or individually. Moreover, drive motors 13 and 14 and drive motors 13' and 14' can be operated in a series connection. Additionally, the two series connections of two drive motors—13 and 14, or 13' and 14'—can be operated in parallel. Depending on the operating mode, the electronic control unit 20 triggers the remaining switches in the necessary manner with NO contact S1 closed. When the operating drive motors are turned off, the drive motors are short-circuited temporarily and, therefore, braked to a halt, by opening NO contact S1-which is common to all drive motors-and correspondingly switching over NC contacts S3, S3', S3" and changeover contacts S2, S2', so that the critical resonant frequencies of the individual fans are passed through very quickly. To short-circuit the individual motors, switches S2 and S3 must be actuated as described for FIG. 1, and switches S3', S3" and S2' must be actuated in analogous fashion.

Additional parallel sub-circuits, each having a drive motor, can be provided in the circuit configuration 10 according to FIG. 5 as well, whereby drive motors, NC contacts and changeover contacts are incorporated in identical fashion with parallel sub-circuits 18' and 19'. With n drive motors in n parallel sub-circuits, one changeover contact and one NC contact are connected in series with the respective drive motor in the uneven-numbered sub-circuits as counted from the NO contact S1, and only one NC contact is connected in series with the respective drive motor in each even-numbered sub-circuit. The number n of possible drive motors is an even number.

What is claimed is:

1. A radiator blower, in particular for motor vehicles, comprising a plurality of individual fans (11, 12; 11, 12, 21; 11, 12, 11', 12'), each having an electrical drive motor (13, 14; 13, 14, 22; 13, 14, 13', 14'), and comprising a circuit configuration (10) having a plurality of switches (S1, S2, S3; S1, S2, S3, S2', S3'; S1, S2, S3, S2', S3', S3"), each of which is capable of being switched over into two positions (0, 1), by means of which said circuit configuration the drive motors (13, 14; 13, 14, 22; 13, 14, 13', 14') are capable of being turned on and back off individually or in a series or parallel connection, wherein, when the operating drive motor or motors (13, 14; 13, 14, 22; 13, 14, 13', 14') is/are turned off, the switches (S1, S2, S3; S1, S2, S3, S2', S3'; S1, S2, S3, S2', S3', S3") are forced into switch positions that bring about a short-circuiting of the turned-off drive motor or motors (13, 14; 13, 14, 22; 13, 14, 13', 14').

2. The radiator blower according to claim 1, wherein the short-circuiting of the drive motors (13, 14; 13, 14, 22; 13, 14, 13', 14') is brought about using only those switches (S1, S2, S3; S1, S2, S3, S2', S3'; S1, S2, S3, S2', S3', S3") and line connections of the circuit configuration that are provided to turn the drive motors (13, 14; 13, 14, 22; 13, 14, 13', 14') on and off, and to connect them in series and in parallel.

3. The radiator blower according to claim 1, wherein, to turn n drive motors (13, 14; 13, 14, 21; 13, 14, 13', 14') on and off, they are located in n parallel sub-circuits (18, 19; 18, 19, 23; 18, 19, 18', 19') that are all connected to a voltage source (17) via a switch designed as an NO contact having one active switch contact, whereby n is a whole number greater than one.

4. The radiator blower according to claim 3, wherein, to operate the n drive motors (13, 14; 13, 14, 22; 13, 14, 13', 14') individually in n−1 parallel sub-circuits (18, 19, 18, 19, 23; 18, 19, 18', 19'), one switch—designed as a NC contact (S3; S3, S3'; S3, S3', S3") having one active switch contact—is connected in series with each drive motor (13, 14; 13, 14, 21; 13, 14, 13', 14').

5. The radiator blower according to claim 4, wherein, to connect the n drive motors (13, 14, 22) in series in n−1 parallel sub-circuits (18, 19, 23), one switch—designed as a changeover contact (S2, S2') having two active switch contacts—is located on the connection side of each drive motor (13, 22) opposite the NC contact (S3', S3), the first switch contact of which is located in the sub-circuit (18, 23), and the second switch contact of which is connected to the connection between the NC contact (S3', S3) and the drive motor (22, 14) in the subsequent sub-circuit (23, 19).

6. The radiator blower according to claim 5,
wherein only one changeover contact (S2) is located in the first of n parallel sub-circuits (18), and only one NC contact (S3) is located in the last of the parallel sub-circuits (19), whereby one of them is located on the high-potential side, and the other is located on the low-potential side of the respectively associated drive motor (13, 14).

7. The radiator blower according to claim 4,
wherein, for the series connection of two of the n drive motors (13, 14, 13', 14') in each uneven-numbered, parallel sub-circuit (18, 18') as counted from the NO contact (S1), a switch designed as a changeover contact (S2, S2') having two active switch contacts is located on the connection side of the drive motor (13, 13') opposite the NC contact (S3, S3', S3"), the first switch contact of which said switch is located in the sub-circuit (18, 18'), and the second switch contact of which is connected to the connection between the NC contact (S3, S3') and the drive motor (14, 14') in the subsequent, even-numbered, parallel sub-circuit (19, 19').

8. The radiator blower according to claim 1,
wherein, when two drive motors (13, 14) are involved, the circuit configuration (10) comprises three switches, one of which is designed as a NO contact (S1), and another is designed as a NC contact (S3)—each having one active switch contact—and one of which is designed as a changeover contact (S2) having two active switch contacts,
wherein the two drive motors (13, 14) are located in two parallel sub-circuits (18, 19) that are both connected to a voltage source (17) via the NO contact (S1), wherein the NC contact (S3) is connected in series with the one drive motor (14), and the changeover contact (S2) is connected in series with the other drive motor (13) in one of the parallel sub-circuits (19, 18) in each case, whereby, in each case, one of the two switches is located on the high-potential side, and the other is located on the low-potential side of the associated drive motor (14, 13), and wherein, of the two switch contacts of the changeover contact (S2), the first one is located in the sub-circuit (18), and the second one is connected to the connection between the NC contact (S3) and the associated drive motor (14).

9. The radiator blower according to claim 1,
wherein, in order to turn the drive motors (13, 14; 13, 14, 22; 13, 13', 14, 14') on and off, and to connect them either in series or in parallel, an electronic control unit (20) is provided that triggers the switches (S1, S2, S3; S1, S2, S3, S2', S3';
S1, S2, S3, S2', S3', S3"**) according to a specified program for changing them over.

10. The radiator blower according to claim 9,
wherein, when the drive motors (13, 14; 13, 14, 22; 13, 14, 13', 14') are turned off, the NO contact (S1) assumes its opened position, and the NC contact (S3;
S3, S3', S3, S3', S3") assumes its closed position, and the changeover contacts (S2; S2, S2'; S2, S2'**) are switched over to their first switch contacts.

11. The radiator blower according to claim 9, wherein, when the operating drive motors (13, 14; 13, 14, 22) are turned off by opening the NO contact (S1), the NC contacts (S3; S3, S3'; S3, S3', S3') are changed over to their opened position, and the changeover contacts (S2; S2, S2'; S2, S2') are temporarily switched over to their second switch contact.

* * * * *